United States Patent
Bao-Coutado (10) Patent No.: US 7,464,890 B2
(45) Date of Patent: Dec. 16, 2008

(54) FLY FISHING REEL

(75) Inventor: Carlos Bao-Coutado, León (ES)

(73) Assignee: Bawer Technology S.L., Villarente (León) (ES)

( * ) Notice: Subject to any disclaimer, the term of this patent is extended or adjusted under 35 U.S.C. 154(b) by 0 days.

(21) Appl. No.: 11/834,862

(22) Filed: Aug. 7, 2007

(65) Prior Publication Data

US 2008/0035773 A1  Feb. 14, 2008

(30) Foreign Application Priority Data

Aug. 9, 2006  (ES) ................. 200602168
Jan. 2, 2007  (ES) ................. 200700001

(51) Int. Cl.
*A01K 89/02* (2006.01)
(52) U.S. Cl. ............... 242/317; 242/257; 242/295
(58) Field of Classification Search ............. 242/317, 242/257, 295, 300, 301
See application file for complete search history.

(56) References Cited

U.S. PATENT DOCUMENTS

| 2,591,338 | A | * | 4/1952 | Leo ............... 242/256 |
| 3,446,453 | A | * | 5/1969 | Pachner ............ 242/256 |
| 4,796,831 | A | | 1/1989 | Sheppard |
| 5,443,218 | A | * | 8/1995 | Ciocca ............ 242/256 |
| 5,918,826 | A | * | 7/1999 | Arkowski ........... 242/295 |
| 6,053,445 | A | * | 4/2000 | Farris ............ 242/303 |
| 7,216,825 | B2 | * | 5/2007 | Oishi et al. .......... 242/247 |

FOREIGN PATENT DOCUMENTS

| EP | 1 027 826 | 8/2000 |
| GB | 1 350 533 | 4/1974 |
| GB | 2060332 | 5/1981 |
| GB | 2 203 211 | 10/1988 |

\* cited by examiner

*Primary Examiner*—Emmanuel M Marcelo
(74) *Attorney, Agent, or Firm*—McGlew & Tuttle, P.C.

(57) ABSTRACT

Fly fishing reel comprising a housing (2, 102, 202), driving means (3, 103, 203), a gearing (4, 104, 204), mechanically connected to the driving means (3, 103, 203), a spool (5, 105, 205) connected mechanically and rigidly to the gearing (4, 104, 204), with said gearing (4, 104, 204) and spool (5, 105, 205) forming a rigid kinematic unit (12, 112, 212), and a brake (8, 108, 208). The reel comprises a one-way clutch (7, 107, 207) between driving means (3, 103, 203) and gearing (4, 104, 204). Brake (8, 108, 208) comprises a free wheel mechanism (9, 109, 209) and acts upon rigid kinematic unit (12, 112, 212), and the force can be regulated continuously. In the line feed-out direction (6, 106, 206), one-way clutch (7, 107, 207) is inactive and free wheel mechanism (9, 109, 209) is active, whereas in the wind up direction of line (6, 106, 206), one-way clutch (7, 107) is active (4, 104, 204) and free wheel mechanism (9, 109, 209) is inactive.

14 Claims, 11 Drawing Sheets

FLY FISHING REEL

FIELD OF THE INVENTION

The invention relates to a fly fishing reel comprising [a] a housing, [b] driving means, [c] a gearing, mechanically connected to said driving means, [d] a rotary spool for winding up line, connected in a mechanically rigid manner to said gearing, with said gearing and said spool forming a rigid kinematic unit, and [e] a brake with adjustable force.

STATE OF THE ART

In the state of the art, manual, semi-automatic and automatic fly fishing reels are known, which have a gearing and an adjustable brake.

The main function of the brake is to provide an additional resistance to the line feed-out from the spool when the fish strikes and pulls the hook. The brake also fulfils the secondary function of preventing the line from coming out of the spool in an uncontrolled manner during casting.

The line for fly-fishing consists, at least, of two parts. The first is a transparent fishing line tied to the hook, which is a few centimeters long and is called a leader. After this, a special thread is tied for fly-fishing known as "fly line" which is characterised by its flexibility. Because of the space it takes up inside the spool, the "fly line" is not usually very long, therefore, if extra line is needed, a reserve fishing line is tied to the end of the "fly line" opposite the leader, which is known by the English term "backing". The leader is the weakest part of the line and therefore determines the tensile strength of the assembly. Consequently, the leader also determines the maximum force to which the reel brake must be adjusted to prevent the line from breaking.

The two functions of the brake described above require opposing adjustments of the brake force.

On the one hand, during casting, the braking action must be gentle, in other words, the brake must be adjusted to a reduced force level that creates a reduced braking torque, so that it is easier to feed out the line, nevertheless, preventing the line from being fed out in an uncontrolled manner. In this way, when casting, the hook can be placed more accurately and the risk of entangling the line is reduced. On the other hand, when the fish strikes, it is desired that the brake be adjusted to a force level that creates a resistant torque that opposes the torque produced by the pulling action of the fish, and which is high enough to cause the fish to tire and make it easier to bring it nearer the shore so that it can be taken out of the water. However, the force of the brake must be adjusted to create a braking torque that prevents the leader from breaking when the fish pulls strongly.

Adjusting the brake force level to the casting action prevents the leader from breaking, but when the fish pulls the line, it finds a reduced resistant torque. With a reduced resistant torque the fish does not tire as much and has more chance of escaping. On the contrary, if the brake force is adjusted to the maximum allowable tensile stress of the leader, the fish finds greater resistance to the output of line, but the force needed to feed out the line when casting is considerably increased. This does not allow the hook to land gently and accurately, and can reduce the distance reached when casting the line or alert the fish to the presence of the hook.

The adjustable brakes in the state of the art aimed at solving this problem have various drawbacks. First of all, the braking torque can only be varied discretely, in other words in a staggered manner, to increase or reduce the resistance that the fish has to overcome. Consequently, it is not possible to accurately adjust the braking torque before each incident. Secondly, when the user tries to retrieve the line using the reel driving means while the fish is pulling, the brake slips. This reduces the reel's efficiency and gives the fish more chance to escape. Finally, the adjustable brakes in the state of the art do not respond immediately, which means the user looses sensitivity when the fish does not pull very strongly.

Moreover, with the state of the art reels, when catching a fish the angler has both hands occupied, in other words, one hand holds the rod and the other one activates the driving means. Therefore, the risk of losing the fish owing to reduced manoeuvrability is considerable. This means that, in practice, most anglers retrieve the line without using the reel driving means, in other words pulling the line with their hands instead of using the lever, handle, button or the like. One of the problems caused by retrieving the line manually is the high line tension variations between when the line is being pulled and when it is released to be picked up again at a higher point on the rod for re-pulling with a movement nearer the reel. These tension variations cause the end of the rod to lurch, which makes it easier for the fish to break free from the hook.

Another important factor in fly-fishing is retrieving the line quickly.

With the state of the art manual reels, the handle is usually assembled on the spool as an integral part, whereby when the spool rotates, the handle rotates with it. This redounds in the user ending up retrieving the line by hand. Retrieving the line by hand is slow and also causes the rod to lurch as described above.

With semi-automatic reels, the spool is driven by a gearing made up of a gear train, which in turn transmits the driving force from a lever that swivels around an axis. In these reels there is also the problem that if the catch is considerable large, or the braking force is reduced, the lever force cannot be transmitted to the spool because the brake slips. In practice, this type of reel is only appropriate for retrieving the line by activating the lever, when the catch is small and the braking force is adjusted to a high level. When the size of the catch is considerable, it usually has to be gathered by retrieving the line by hand. This has the drawbacks already described above.

As mentioned, the third type of state of the art reel is the automatic reel. The problems associated with this type of reel regarding the brake and its capacity to quickly retrieve the line are similar to the problems explained with respect to semi-automatic reels. However, furthermore, in this case, the excessive weight of the automatic reels, together with their not very effective retrieval mechanisms, has meant that this type of reel is not very popular in the market.

It is also worth mentioning that neither do the known semi-automatic and automatic reels allow all line thicknesses available in the market to be used. This considerably limits the reels' performance, as the larger line calibres cannot be wound.

Finally, another problem caused by automatic and semi-automatic reels is their tendency for the line to twist back on itself, causing a shape memory effect. This causes spirals to form in the line that reduce the distance that can be reached during casting. It has been proved that line memory can reduce the casting by several meters. This drawback is particularly inconvenient when fishing in lakes or in the sea, where the dragging effect of the current cannot be used to bring far away fish closer.

DISCLOSURE OF THE INVENTION

The object of the invention is to obtain a reel that improves the problems described in the state of the art and that can be applied to multiple variations of fly-fishing. This aim is achieved by means of a fly fishing reel of the type indicated at the beginning, characterised in that it comprises     [f] a one-way clutch provided between said driving means and said gearing,     [g] in that said brake comprises a free wheel mechanism with said brake acts upon said rigid kinematic unit, and     [h] in that said force of said brake is regulated continuously, so that in the line feed-out direction, said one-way clutch is inactive and said free wheel mechanism is active, whereas in the wind up direction of line, said one-way clutch is active and said free wheel mechanism is inactive.

Under the concept of a rigid mechanical connection, it is understood that there is no greater sliding action between both parts other than the actual sliding action attributable to mechanical play. Therefore, for example, between the gearing and the spool there will no clutch type or torque limiting connection that allows the gearing rotation axis and the reel rotation axis to have different rotation speeds. It is precisely this characteristic that considerably improves the characteristics of the state of the art reels, because it prevents the brake from slipping when the catch is being pulled in, irrespective of the tension produced on the line.

The concept of an active one-way clutch or an active free wheel mechanism means, in this invention, that when these connections are active they can transmit force, whereas when they are in their inactive position, they cannot transmit force. So, for example, in the line feed-out direction, when the free wheel mechanism is activated, the brake is performing a braking torque, whereas in the line wind up direction, when the free wheel mechanism is deactivated, the brake does not oppose the mechanical resistance.

Finally the continuous adjustment of the braking force implies that the force to which the brake is adjusted is not staggered, and therefore the braking torque of the actual brake can be adjusted with great precision.

In this way, the reel according to the invention makes it possible to fish in a particularly innovative way. When casting the line, the brake force is adjusted to its minimum value. This way the line is fed out gently and in a controlled manner, because the brake is creating a braking torque that brakes the line slightly, but allows the user to feed out the line with a very reduced pulling action on the line. All this enables the user to land the hook on the water more accurately.

When the fish strikes and pulls the line, the brake's free wheel mechanism is activated again and therefore the brake is creating a resistant braking torque on the line output. At this point the user can increase the braking force continuously, in other words, without staggering the braking torque, to provide a greater resistant torque on the line output and therefore tire the fish. At this point, the gearing is not transferring any force to the driving means, owing to the fact that the one-way clutch between the gearing and the driving means is inactive. While struggling with the fish, the user can chose to retrieve part of the line to prevent the fish from moving too far away. By acting on the driving means, which can be, for example, a swivel lever, a handle or a button, the one-way clutch is activated. This one-way clutch rigidly transmits the force of the driving means to the spool, in other words there is no sliding between the driving means, gearing and spool. Simultaneously, when activating the driving means the brake's free wheel mechanism is deactivated, in other words the brake is inactive, whereby the user only has to apply the force needed to gather in the fish, without having to apply any additional force to overcome the brake's resistant torque. As already mentioned, the state of the art reels have a brake that slips when line tension is excessively high, precisely because this brake is normally provided between the gearing and the spool. This solution of using the brake as a kind of clutch is necessary because the brake cannot be adjusted continuously, and therefore the brake's resistant torque cannot be adjusted as desired, so the brake's clutch type function must be used to prevent the leader line from breaking. On the contrary, with the reel according to the invention, the brake's continuous adjustment makes the brake versatile which prevents it from slipping. In other words, the fish is tired using the brake and when the fish pulls with less strength the line is retrieved, so as to resume the struggle allowing the fish to move away fighting against the brake. Therefore, as the brake does not behave like a clutch, when the driving means are activated the force that the user applies with his hand is transmitted in full to the spool, with the advantage this implies. Moreover, this mechanism is much more efficient than the state of the art mechanisms, as there is no power loss caused by friction.

Preferably the brake comprises a brake disc with first and second parallel surfaces and at least one first brake block that can act on said first surface and a second brake block symmetrically opposite said first brake block, with respect to said disc, which can act on said second surface and said disc is linked to said gearing via said free wheel mechanism, so that said brake acts by braking said gearing. If the brake disc brakes the gearing instead of the spool, the spool can be dismantled without causing any problems with the reel. This characteristic is important in fly fishing as anglers normally fish with various spools, and change them according to the thickness of the line they want to use. This embodiment contemplates various options. A first option consists in the brake disc being linked to the gearing by the free wheel mechanism, but not being able to move longitudinally with respect to the gearing and that both brake blocks can move with respect to the disc. By virtue of this arrangement, the possible wear of the brake blocks is compensated at all times because the blocks are constantly pressing against the disc. However, this embodiment is complex in terms of assembly and has a large number of movable parts. Therefore, preferably, said first brake block is fixed to said housing, said second brake block is movable with respect to said housing in a direction perpendicular to said first and second surfaces and said disc is movable with respect to said gearing in said perpendicular direction to said first and second surfaces. This solution is simpler is terms of assembly, and it is therefore more economical. Also, owing to the fewer number of small size movable parts, the design is more robust. It must be taken into account that fishing reels are subjected to fairly unpredictable mechanical conditions. For example, it is not unusual for an angler to drop the rod on the floor when taking the fish out of the water.

Preferably said disc is a ring, with said ring being guided by inner diameter of said ring, on to an outer blocking diameter of said gearing, said disc comprising at least two notches in said inner diameter, said notches comprising a slope, and in each notch a rolling body is provided, with said rolling bodies being capable of being blocked between said slope and said outer blocking diameter. This embodiment of the free wheel mechanism allows the brake to act immediately, as soon as the spool begins to rotate in the line feed-out direction. Said rolling bodies can be balls, rollers, discs or the like. Also, unlike a conventional pawl, this embodiment is particularly silent, which helps not to frighten the fish to be caught.

Alternatively said brake comprises a first ring with a first conical surface and a second rotary ring with a second conical surface, with said first and second conical surfaces being suitable for co-operating mutually to generate a braking torque and said second ring and said gearing co-operate mutually via said free wheel mechanism, so that said brake is able to brake said gearing. This arrangement is particularly robust and provides a particularly effective brake blockage.

Preferably said free wheel mechanism comprises a one-way bearing, said one-way bearing comprising a third pinion, and a fourth pinion, said second ring comprises a fifth pinion and said ring gear of said gearing comprises a first outer gear teeth, so that said fifth pinion meshes with said fourth pinion, while said third pinion meshes with said ring gear. By virtue of this arrangement, space is saved inside the reel, because the second ring proper does not need to mesh directly with the gearing ring gear.

Preferably said driving means comprise a swivel lever with a gearing sector at one end thereof, said gearing sector having a toothed portion that meshes with a first pinion of said gearing and a flat portion that is part of said one-way clutch. If the driving means are a swivel lever biased with a spring, the reel can be used with just one hand. This way, the user has one hand free for comfortably picking up the fish once it is on the shore. Also, thanks to the fact that there is no sliding between the spool axis and the gearing axis and that when the lever is activated slightly neither is there any sliding between the lever and the gearing, the lever can function as a blocking device for the line output.

Preferably the flat portion forms a saddle that connects the main body of said lever to the beginning of said gear sector. By virtue of this arrangement, it is guaranteed that the gearing pinion does not mesh accidentally with the toothed portion of the gear sector and therefore blocks the output of the line.

Preferably said brake comprises means for regulating the braking torque, said regulating means comprising a take-up spring and a take-up screw. This embodiment means it is possible to continuously and very precisely adjust the braking torque that the brake applies to the spool in the line feed-out direction. In particular, the take-up screw applies a compression force to the take-up spring. In turn, the compression force applied to the take-up spring is transmitted to the brake blocks that apply a normal force to the brake disc, thus producing the braking torque.

As mentioned above, in fly-fishing there are two very important factors that can increase the number of successful catches. The first fact is the rod lurching when taking in the fish; the lesser the lurch, the harder it is for the fish to free itself from the hook. The second factor is influenced by the speed with which the line is retrieved; the slower the retrieval speed, the greater the risk of losing the fish. With respect to the second factor it is important, particularly when initially casting the line, to be able to impale the fish quickly enough so that it does not free itself from the hook. Moreover, when struggling with the fish, if the angler can react quickly, he gains a great advantage over his catch.

So, preferably the gearing comprises at least one planetary train, with said planetary train comprising a second pinion, at least three planet gears and a ring gear. The planetary train has a good gearing/occupied volume ratio, which has meant that the applicant has chosen this innovative solution. The benefits of this solution are evident by being able to take in a greater length of line each time the lever is activated. This reduces the number of times the rod lurches with respect to the known semi-automatic reels, because the lever does not need to be activated as often. Also, with semi-automatic line retrieval, line tension variations are greatly reduced in comparison with when the line is retrieved manually, particularly, because the line is never slack. Consequently, the fish does not have the option of shaking the line abruptly to free itself from the hook, and also it has to work much harder, whereby it gets tired more quickly and it is easier to take it out of the water successfully.

Preferably the planetary train comprises four of said planet gears. By increasing the number of planet gears, the force transmitted by each gear tooth is reduced thereby automatically prolonging the useful life of the reel. Also preferably, the ring gear has said outer blocking diameter.

Preferably the spool has an inner line retrieval diameter and the inner diameter is greater than 70 mm. The spool diameter plays a decisive role in line shape memory effect. The greater the spool diameter, the less the line will tend to adopt a spiral shape, which considerably improves the distance that can be reached by casting with the reel.

BRIEF DESCRIPTION OF THE DRAWINGS

Other advantages and characteristics of the invention are appreciated following the description below, which, without any limiting character, relates preferred embodiments of the invention, with reference to the accompanying drawings, in which.

DETAILED DESCRIPTION OF AN EMBODIMENT OF THE INVENTION

The embodiment of the fly fishing reel 1 according to the invention shown in FIGS. 1 to 6 comprises a housing 2 with a main fixed axis 31, driving means 3 which, in this case comprise a lever 13 that swivels thanks to a spring not shown in the figures. At one end thereof said spring is integral with housing 2, while at the other end it is integral with lever 13. However, said driving means 3 can also be a rotary handle, a drive button or the like that allow the user's force to be transmitted to line 6 of reel 1. Housing 2 comprises a main fixed axis 31, on which a gearing 4 is mechanically connected to driving means 3. After gearing 4, a spool 5 is connected in a mechanically rigid manner for winding up line 6. As can be seen from the figures, between gearing 4 and spool 5 there is no sliding, since the link between both parts is formed by a positive locking which, in this case, is a square shaped profile 32. Other types of shaped or friction links are feasible providing that they guarantee that the rotary speed of the spool axis and the rotary speed of the main axis of the gearing, in other words the axis on which the spool is connected, are equal at all times. Therefore, the feasible solutions equivalent to this link include key grooves, transversal pins, snap links, furrows or the like. This leads to spool 5 and gearing 4 forming a rigid kinematic unit 12, in other words, this link does not contemplate any relative sliding between the parts.

Reel 1 also has a brake 8 which force can be regulated as will be explained later.

There now follows a detailed view of the configuration of the parts described until now.

Driving means 3 comprise a lever 13 that at one end thereof has a gear sector 14 that comprises a toothed portion 16 and a flat portion 17. Said gear sector 14 meshes with a first pinion 15 of gearing 4. This way, first pinion 15 and gear sector 14 form the one-way clutch 7.

Gearing 4 comprises first pinion 15 that acts upon ring gear 24 of a planetary train 21 via a pawl 33 preloaded by a spring 34. Planetary train 21 rotates on main axis 31. The inner gear teeth of ring gear 24 mesh with three planet gears 23 which, in turn, mesh with second pinion 22 of said gearing 4. The number of planet gears 23 can also be greater, for example there can be four of them, if it is desired to reduce the effort to be transmitted by the teeth of planet gears 23. Second pinion 22 also comprises a square shaped profile 32 on which spool 5 is mounted. This positive locking makes it possible to rigidly transmit movement from gearing 4 to spool 5, in other words without any relative sliding.

Brake 8 comprises a brake disc 10 in the shape of a ring mounted whereby it floats, externally and concentrically on an outer blocking diameter 35 of ring gear 24. Brake disc 10 is caused to brake by two brake blocks 11a, 11b. In this embodiment the first block 11a is integral with housing 2 and acts upon a first surface 36a of disc 10, whereas the second block 11b can be moved in the direction perpendicular to the second surface 36b of brake disc 10 by means 18 for regulating the force of brake 8. In particular, said regulating means 18 are made up of a take-up screw 20 that compresses a take-up spring 19. When compressed, take-up spring 19 pushes against second movable brake block 11b. This embodiment is particularly robust, because the small parts that move are the minimum essential parts. However, it would be feasible for both brake blocks 11a and 11b to be able to move with respect to disc 10, whereas the disc would be mounted fixedly in the direction of main axis 31 on outer blocking diameter 35 of ring gear 24.

There follows an explanation of how the reel according to the invention operates when the line is cast and retrieved.

In the line feed-out direction 6, in other words when line 6 is cast or when the fish strikes and pulls line 6, spool 5 is the element that drives the system. So, with reference to the FIGS. 1 and 3, spool 5 rotates on main axis 31 in the clockwise direction. Spool 5 drags second pinion 22 which, in turn, moves planet gears 23 in the anti-clockwise direction. Then planet gears 23 move ring gear 24 in the anti-clockwise direction. Now, with reference to FIGS. 2, 4 and 5, where when line 6 is fed out ring gear 24 rotates in the clockwise direction, it can seen how ring gear 24 drags first pinion 15 in the clockwise direction via pawl 33 that meshes with first pinion 15. First pinion 15 is part of one-way clutch 7 provided between lever 13 and gearing 4. Moreover lever 13 has a gear sector 14 that is made up of a toothed portion 16 and a flat portion 17 that connects to main body 25 of lever 13, forming a saddle 26 and which is also part of said one-way clutch 7. So, pinion 15 driven by pawl 33 in the clockwise direction, rotates on flat portion 17, whereby said one-way clutch 7 is inactive, in other words, gearing 4 does not transmit any movement to lever 13.

Figure 1:
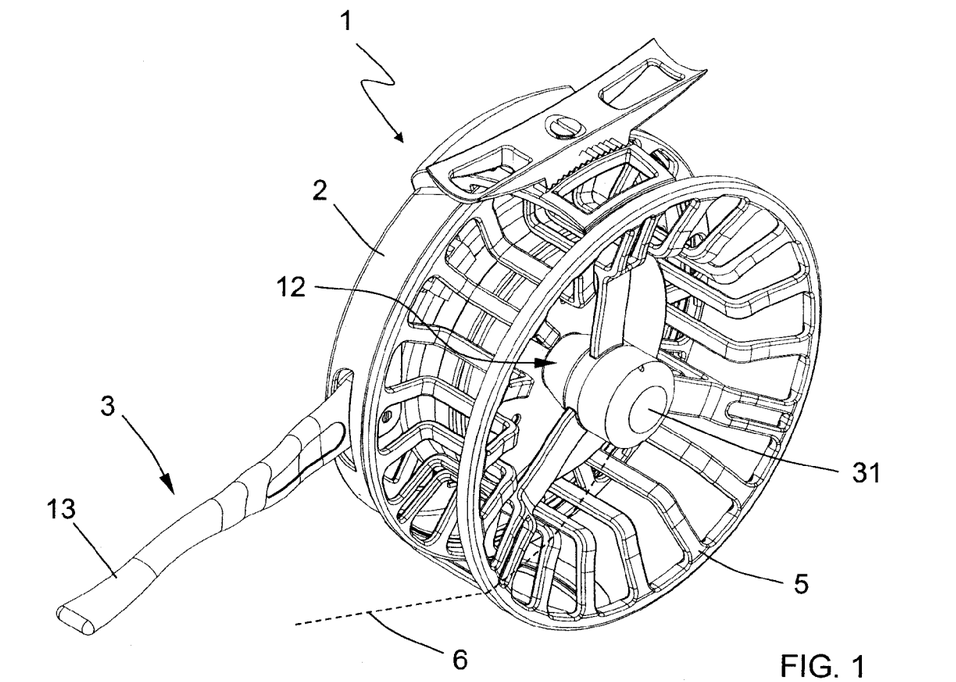
FIG. 1, a perspective view of a first embodiment of the reel according to the invention on the spool side.
Figure 2:
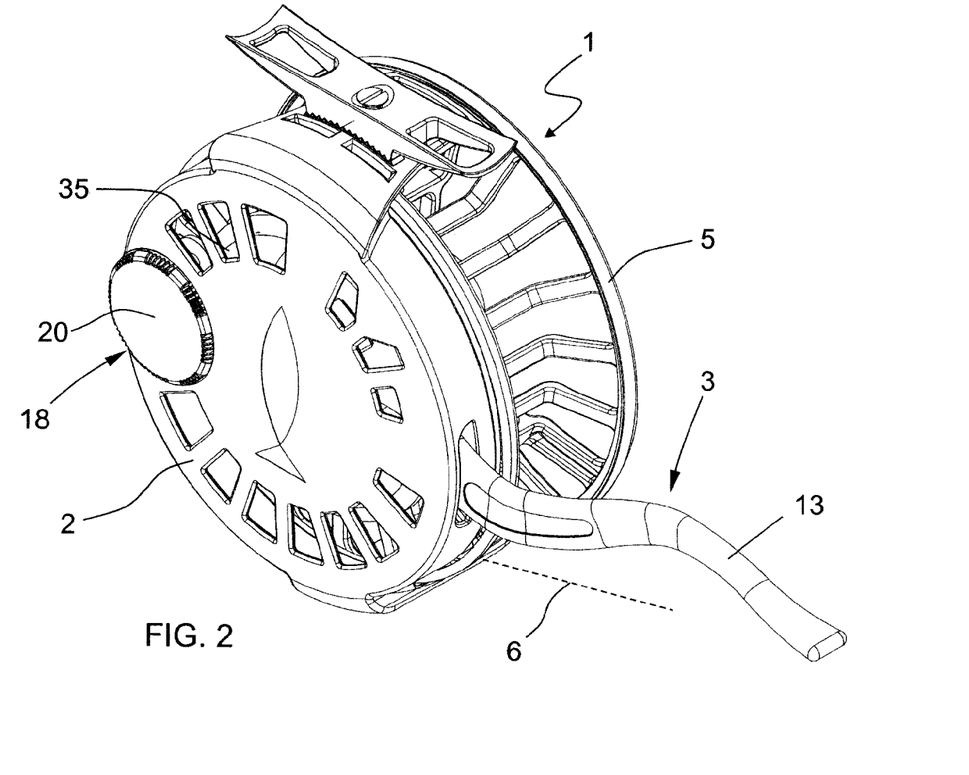
FIG. 2, a perspective view of the first embodiment of the reel on the housing side.
Figure 3:
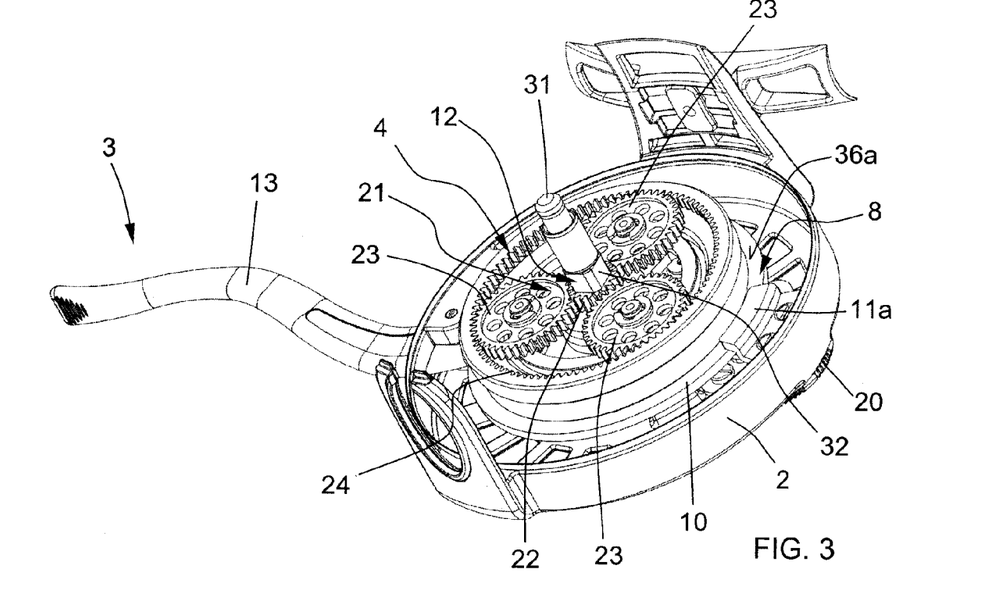
FIG. 3, a perspective view of the first embodiment of the reel on the spool side, without the spool, or the first protection cover of the gearing.
Figure 4:
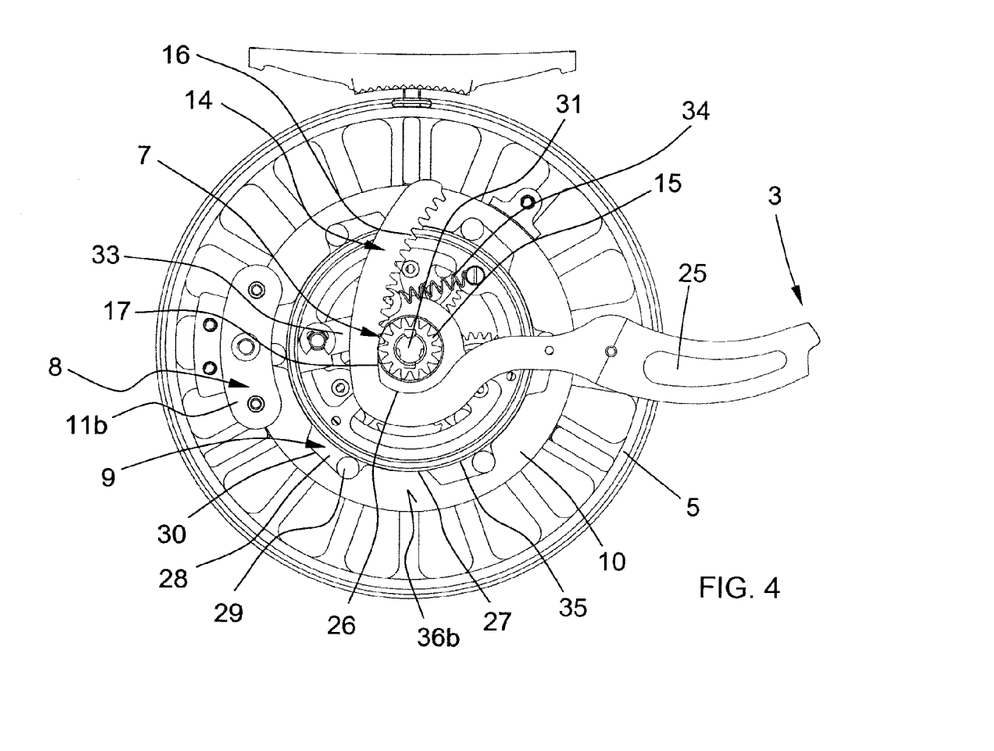
FIG. 4, a front view of the first embodiment of the reel on the housing side, without the housing, or the second protection cover of the gearing.
Figure 5:
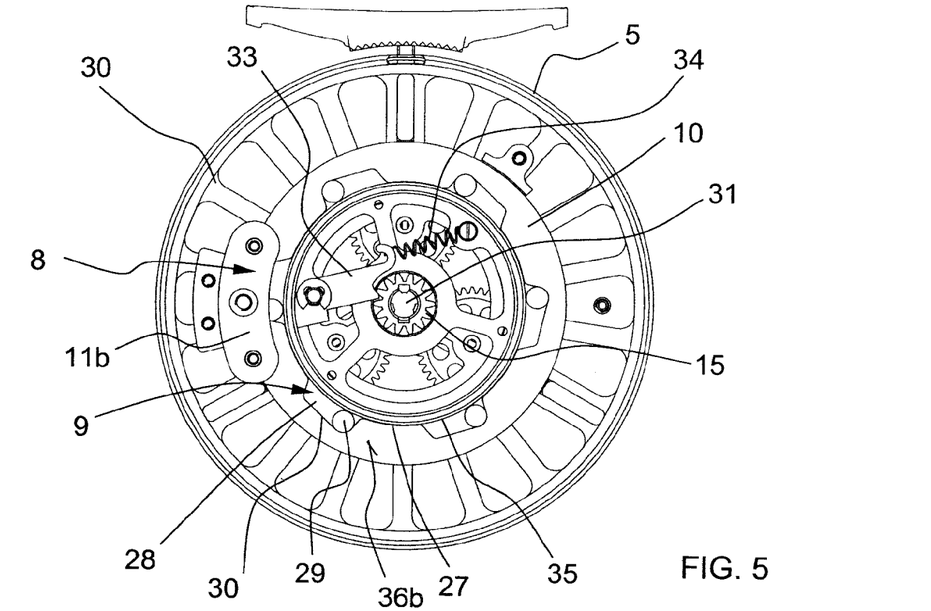
FIG. 5, a front view of the first embodiment of the reel on the housing side, without the housing, or the second protection cover of the gearing.
Figure 6:
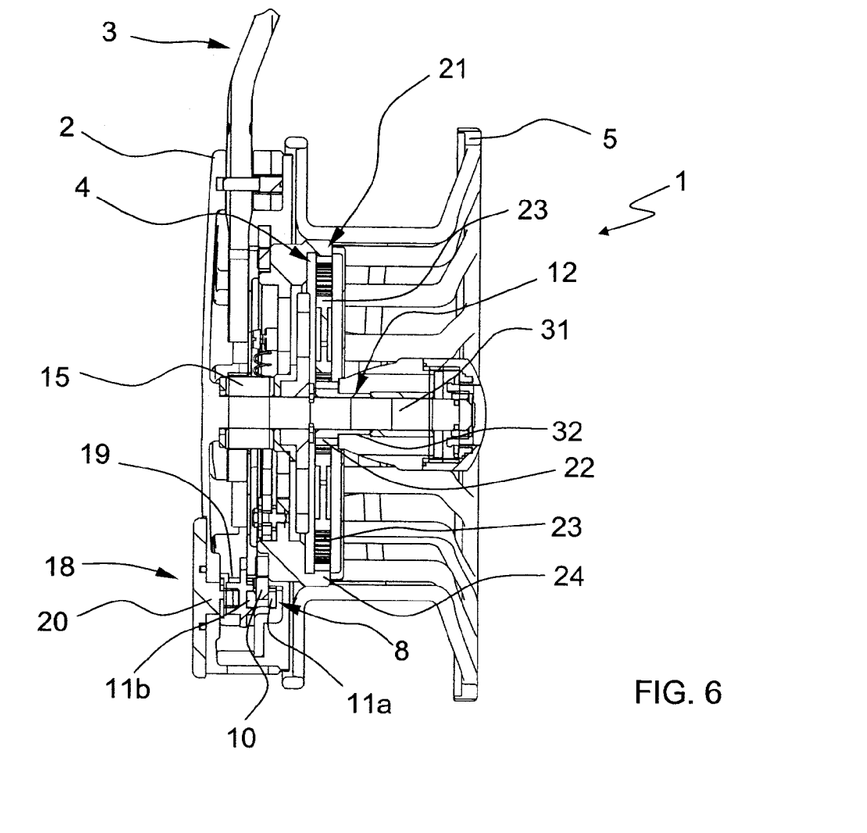
FIG. 6, a cut along the medium plane of the first embodiment of the reel that contains the spool's main axis.
Figure 7:
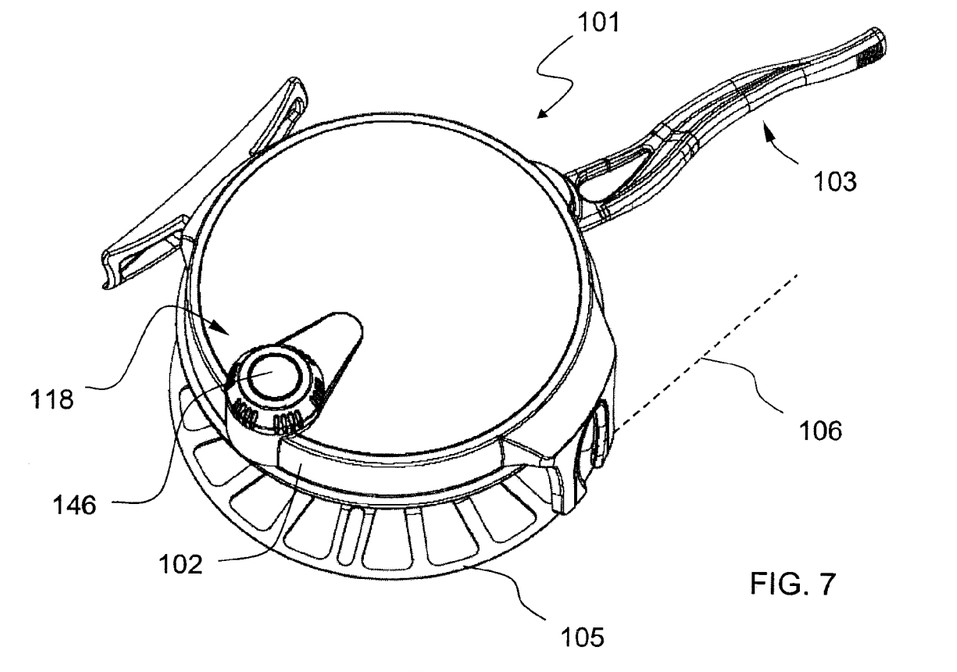
FIGS. 7 to 14, a second embodiment of the reel according to the invention.
Figure 8:
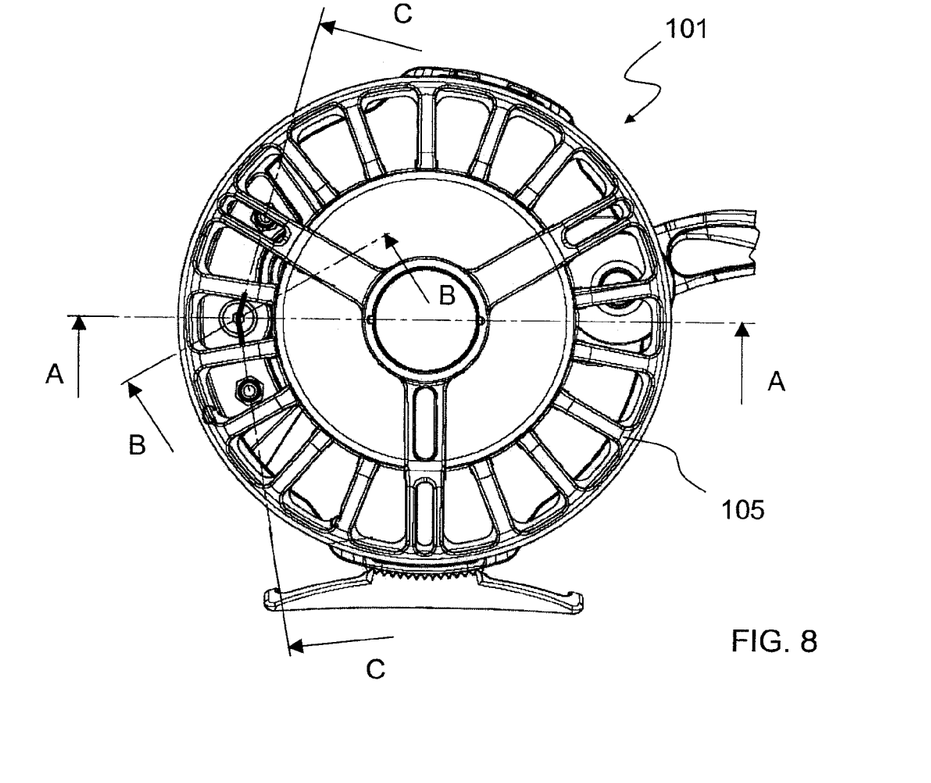
Figure 9:
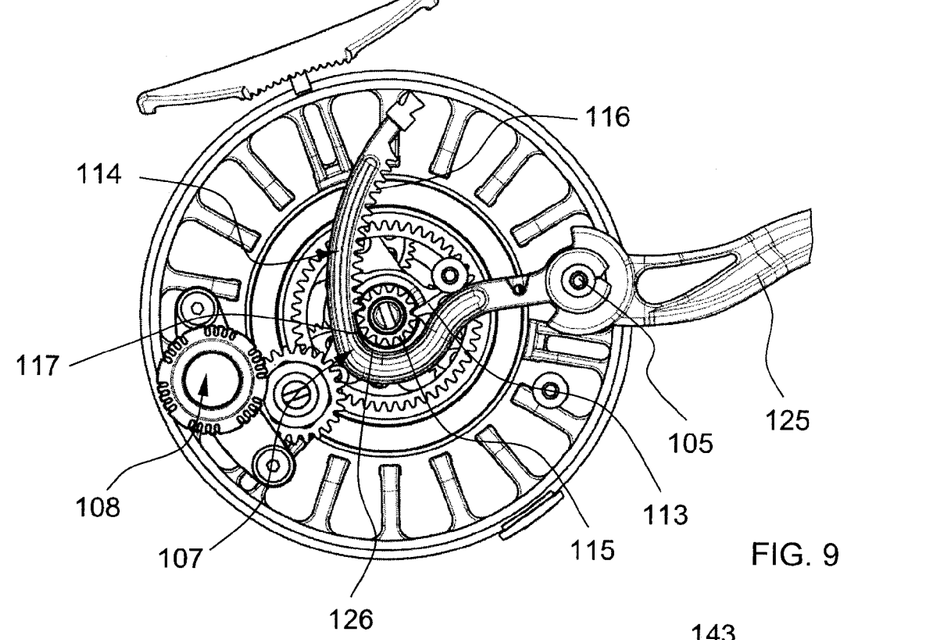
Figure 10:
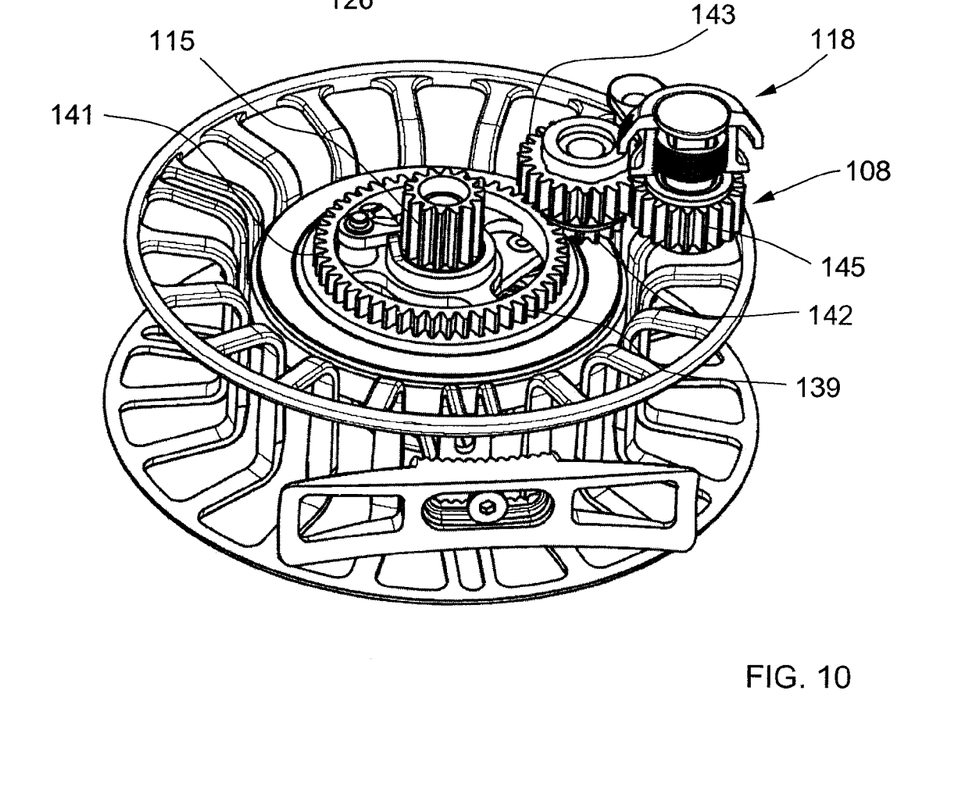
Figure 11:
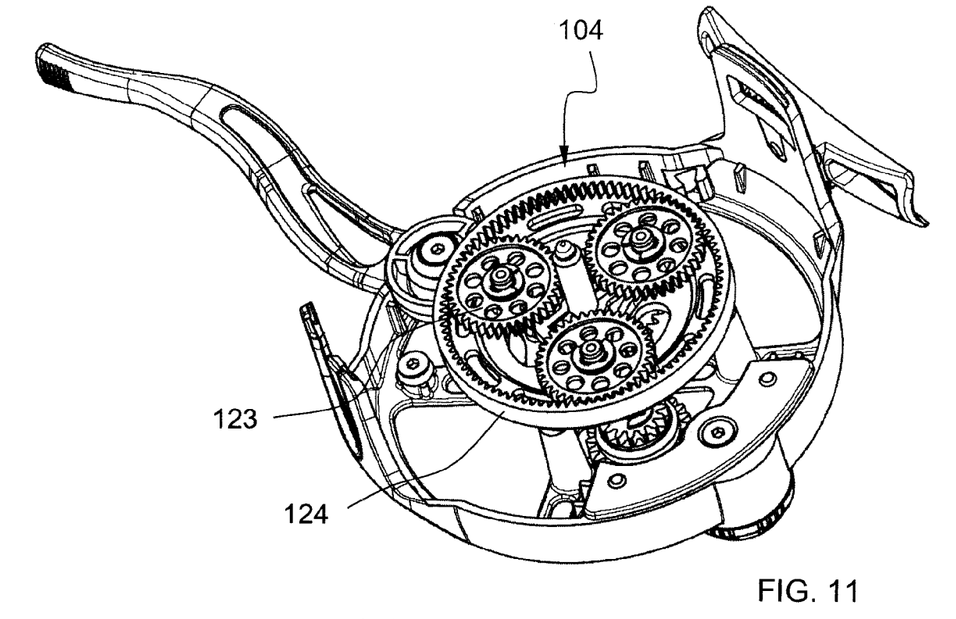
Figure 12:
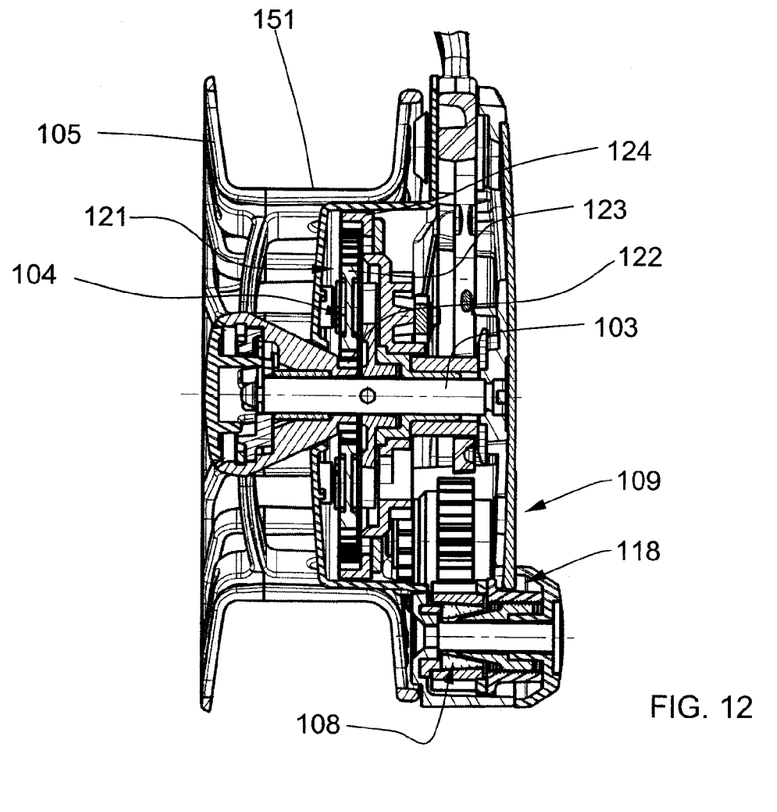

Also on the basis of FIG. 4, an explanation is provided below of the operation of brake 8 when feeding out line 6. As can be seen in this figure, brake disc 10 has some notches 28 in its inner diameter 27 and the part of said notches located furthest from inner diameter 27 has the shape of a slope 30.

Also between each notch 28 of brake disc 10 and outer blocking diameter 35 of ring gear 24 a rolling body 29 is provided. This unit forms free wheel mechanism 9. When ring gear 24 rotates in the clockwise direction in FIG. 4, it drags said rolling bodies 29 in the same direction. So, rolling bodies 29 are blocked between ring gear 24 and brake disc 10, whereby brake disc 10 is dragged by ring gear 24, also in the clockwise direction. As already mentioned, brake blocks 11 that are always compressed by take-up spring 19 pressing on brake disc 10, produce a braking torque that can be regulated continuously from 0 Nm to completely blocking brake disc 10 and therefore the rotation of spool 5.

Precisely at this point it is worth mentioning the outstanding advantage of reel 1 according to the invention in comparison with the state of the art reels. First of all, free wheel mechanism 9 activates brake 8, in other words it allows a braking torque to be created, at a force torque applied to spool 5 that is virtually zero, because the rollers are embedded immediately. Secondly, the regulation of the braking torque value, which is achieved using regulating means 18 for the force of brake 8, can be adjusted continuously without staggering, in other words with considerable sensitivity and accuracy. Nevertheless, when casting, the user must loosen take-up screw 20 so as to be able to feed out line 6 gently. Then, when the user notices the fish pulling, he can work with take-up screw 20, to increase or reduce the braking torque as required to struggle with the fish.

When the user wishes to bring the fish nearer the shore, lever 13 is to be activated. When lever 13 is activated in the anti-clockwise direction shown in FIG. 4, toothed portion 16 of gear sector 14 starts to mesh with first pinion 15. When rotating in the anti-clockwise direction, first pinion 15 drags pawl 33 and therefore ring gear 24. In the way described in the preceding paragraphs, but inverting the rotation directions described above, the movement of ring gear 24 is transferred to spool 5, which starts to rotate in the wind up direction of line 6.

At the same time that the movement of lever 13 is transferred to spool 5, rolling bodies 29 are unblocked automatically and immediately, thereby deactivating free wheel mechanism 9 of brake 8. In other words, as soon as line 6 is taken up brake 8 remains inactive and therefore the force applied by the user is applied in full to spool 5, with the exception, naturally, of losses through friction. At this point it is important to highlight that when lever 13 is activated, no sliding occurs towards spool 5, because the link between gearing 4 and spool 5 is a rigid kinematic unit 12, which guarantees that line retrieval is as efficient as possible.

FIGS. 7 to 13 show a second embodiment of the reel. As can be seen particularly clearly in the section represented in FIG. 13, brake 108 of reel 101 comprises a first ring 137 and a second ring 138. First ring 137 has a first conical external surface 139 that co-operates with the second conical internal surface 140 of second ring 138 to produce the corresponding braking torque.

Figure 13:
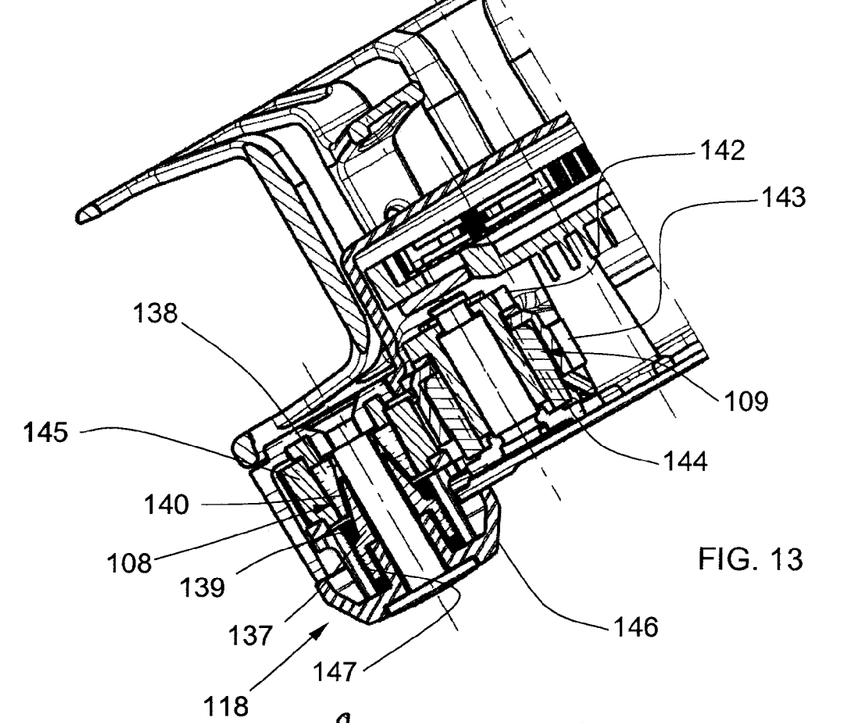

Also, second ring 138 has a fifth pinion 145 that meshes with a fourth pinion 143 that is part of free wheel mechanism 109. Free wheel mechanism 109 also comprises a one-way bearing 144 and a third pinion 142 which, in turn, meshes with first outer gear teeth 141 provided on ring gear 124 of gearing 104.

Figure 14:
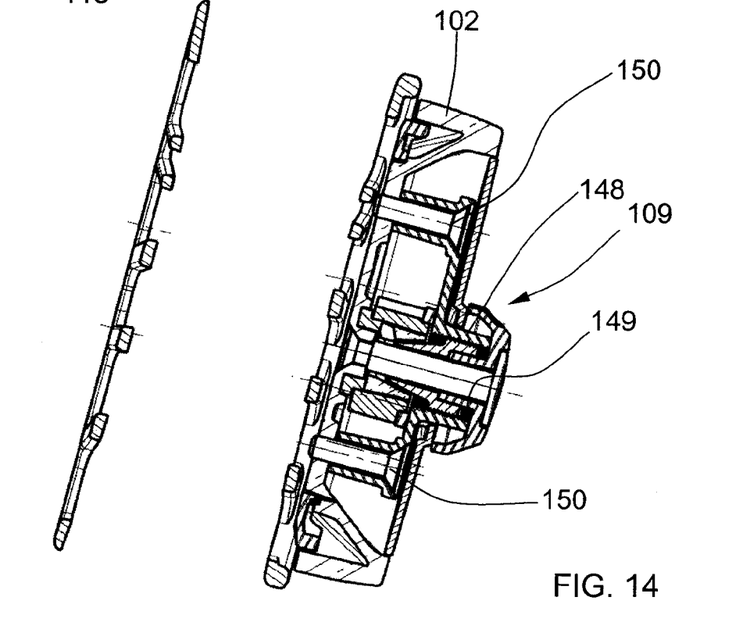
Figure 15:
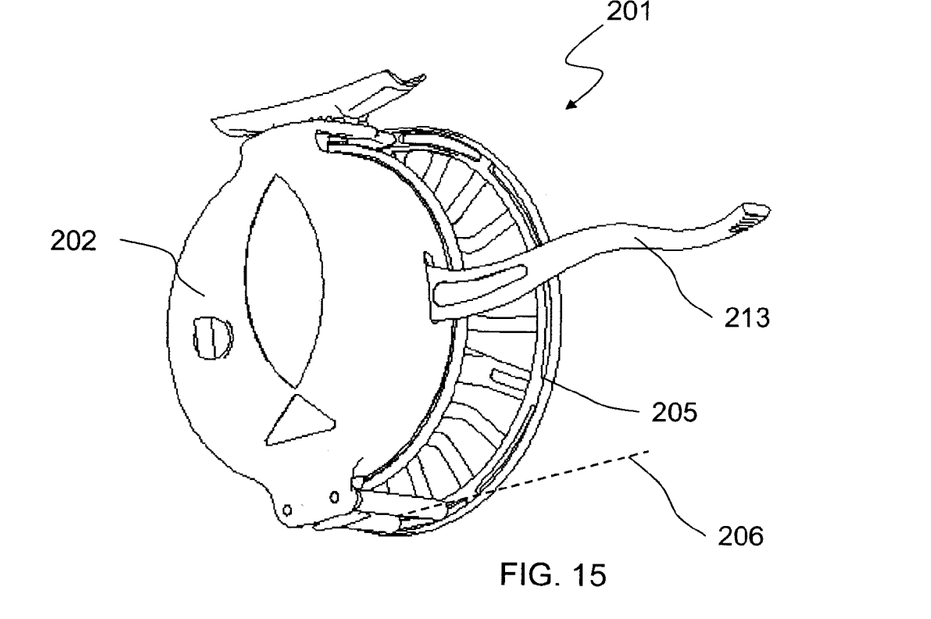
FIGS. 15 to 22, a third embodiment of the reel according to the invention.
Figure 16:
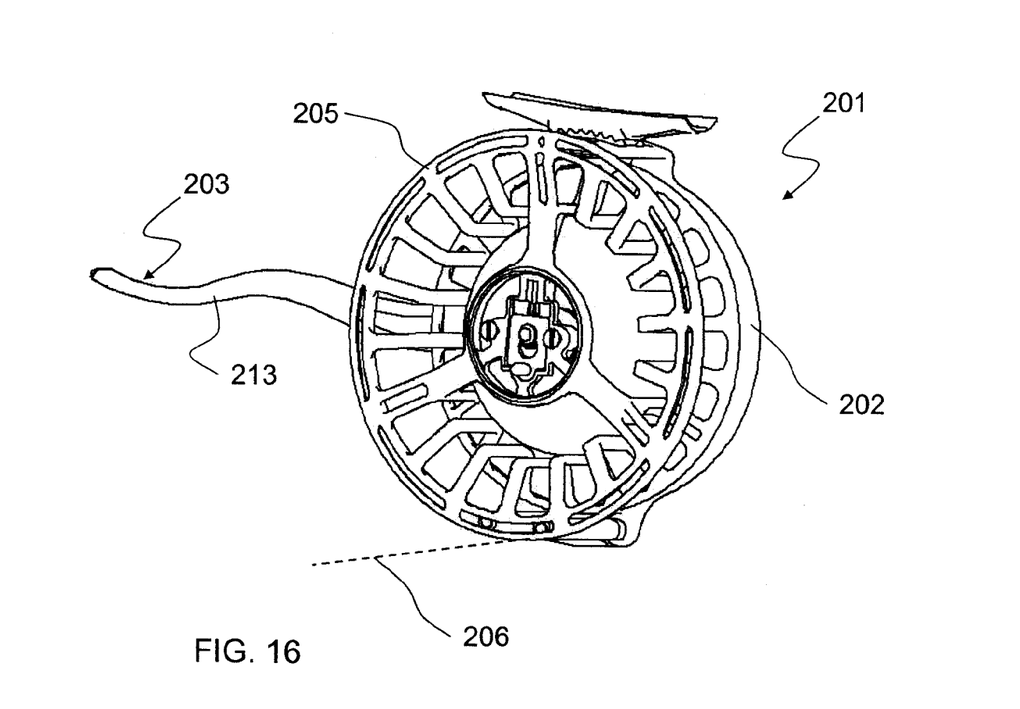
Figure 17:
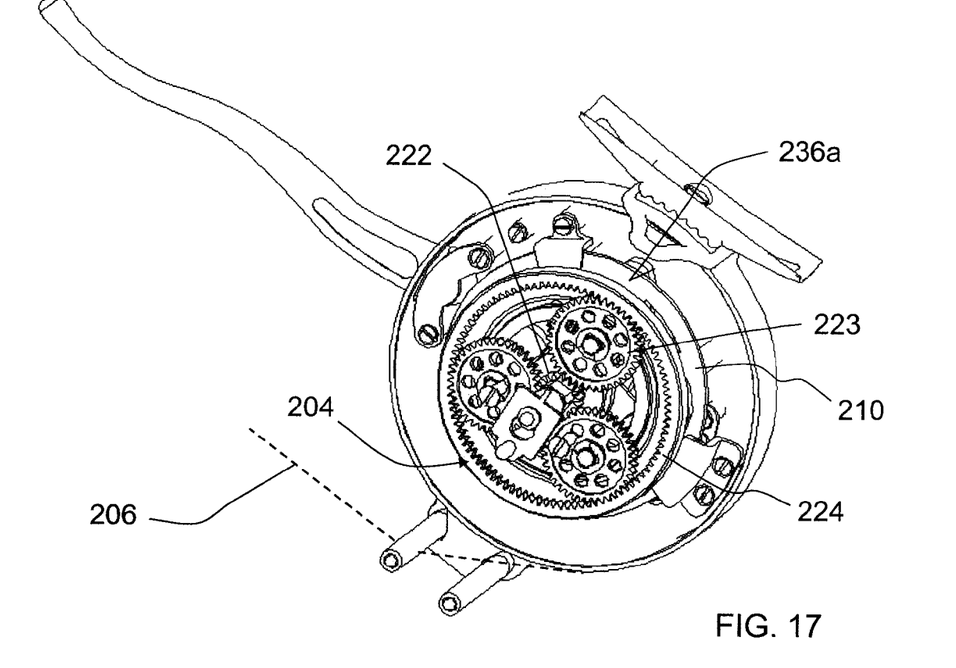
Figure 18:
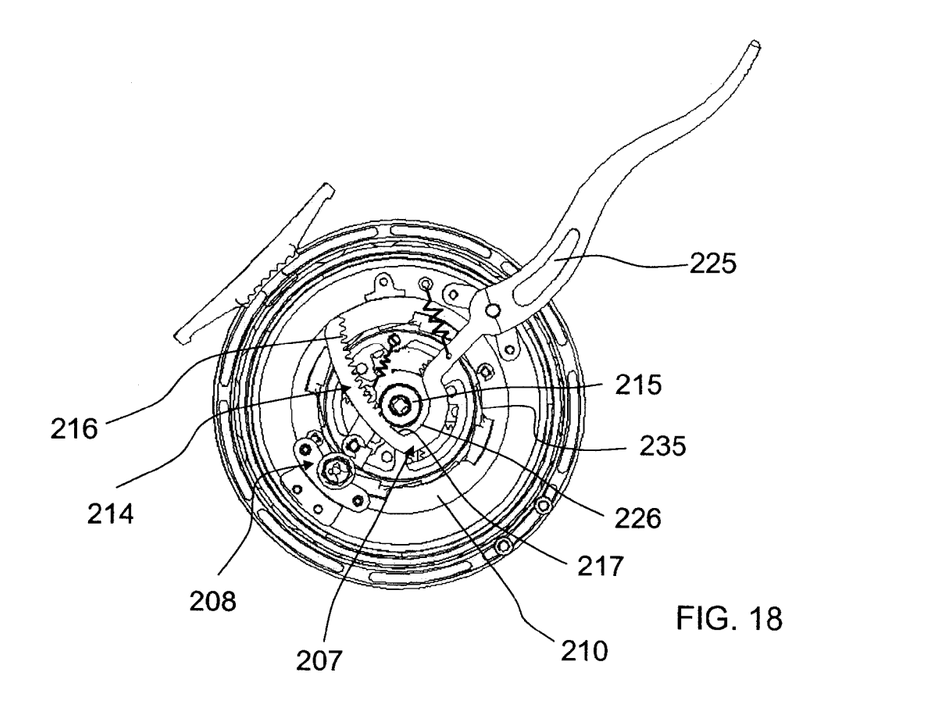
Figure 19:
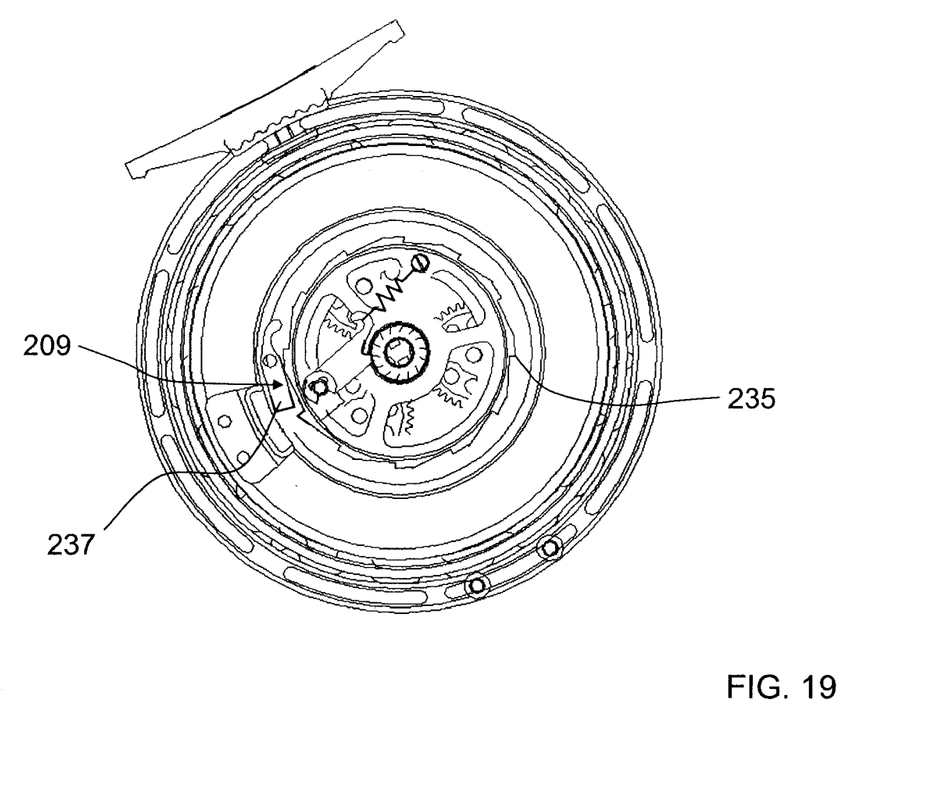
Figure 20:
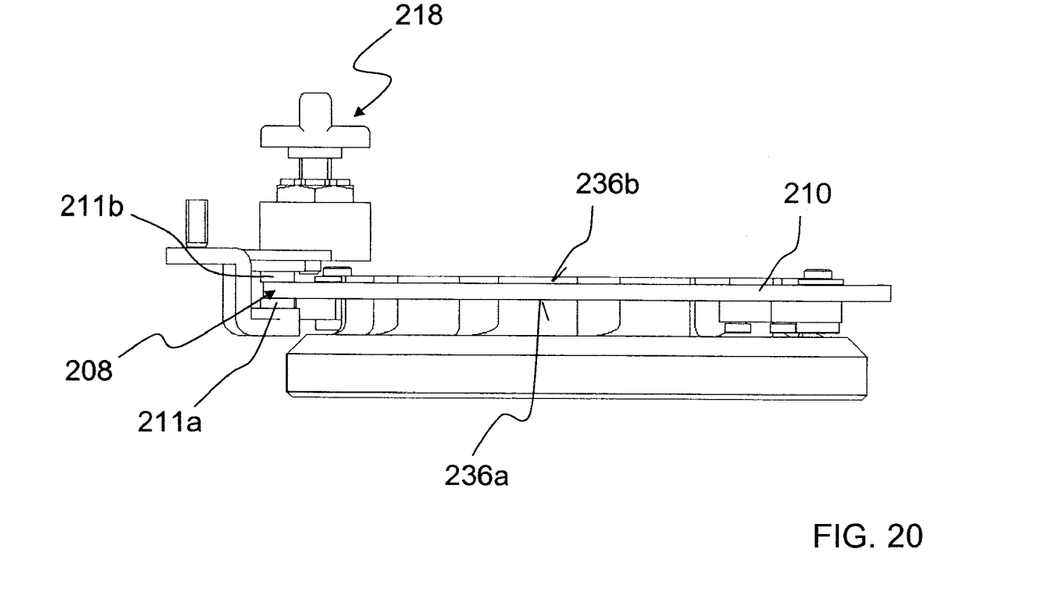
Figure 21:
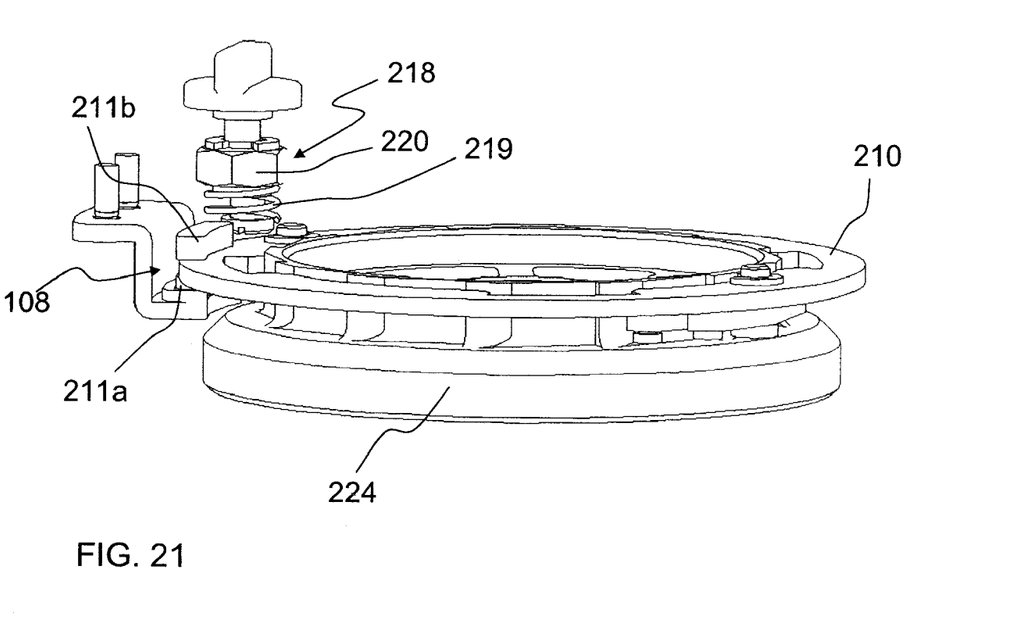
Figure 22:
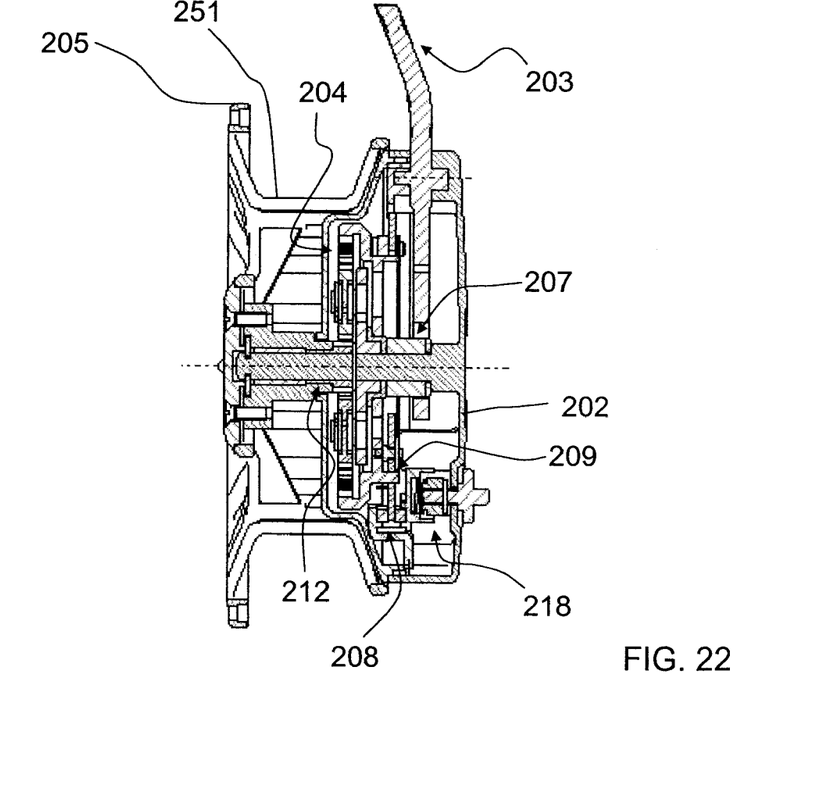

In this embodiment, the force of the brake is regulated by regulating means 118. The cap 146 has a positive locking with first ring 137 in the form of a hexagonal screw. First ring 137 has an outer thread 147 which, as can be seen in a detailed view in the section in FIG. 14, is guided in the inner thread 149 of a bushing 148, fixed to housing 102 by two screws 150.

So, when cap 146 is activated in the pressing direction of brake 108, first conical surface 139 of first ring 137 presses against second conical surface 140, which increases the friction between both surfaces and therefore increases the braking torque.

When the user casts or the fish pulls line 106 as explained above, ring gear 124 and second ring 138 are linked cinematically by first outer gear teeth 141, free wheel mechanism 109 and fifth pinion 145. During the feed-out movement of line 106, free wheel mechanism 109 is active. So, when ring gear 124 rotates, with its first outer gear teeth 141 it drags third pinion 142, which communicates the movement to fourth pinion 143 via one-way bearing 144. Fourth pinion 143 drags fifth pinion 145 of second ring 138. Finally, second ring 138 is braked by the relative friction between the first and second conical surfaces 139, 140, which brakes the feed-out of line 106.

When the user retrieves the line using lever 113, free wheel mechanism 109 is deactivated, in other words one-way bearing 144 does not transfer any movement to third pinion 142 towards fourth pinion 143, whereby brake 108 remains inactive.

FIGS. 15 to 22 show a third embodiment of the reel. In this case, similar to the first embodiment, brake 208 is made up of a brake disc 210 guided in the radial direction by ring gear 224 and by free wheel mechanism 209. Said free wheel mechanism 209 comprises a second pawl 237 that meshes with second outer gear teeth 238 provided on ring gear 224, whereby a positive locking can be established with ring gear 224 in the line feed-out direction 206 from spool 205. Also brake 208 comprises two brake blocks 211 responsible for braking brake disc 210. Finally, means 218 are provided for regulating the braking tension, made up of a take-up spring 219, the tension of which can be regulated by a take-up screw 220. The operating principle of reel 201 both in feeding-out and retrieving line 206 is similar to that described above. Therefore, it is only necessary to clarify that the function performed by rolling bodies 29 in the first embodiment is assumed in this case by second pawl 237, which is responsible for activating and deactivating the brake according to the rotation direction of spool 205.

In this way, the reel according to the invention not only proposes a device that solves the problems raised in the state of the art, but also a new way of fishing. In other words, casting with a reduced braking torque so that the feed-out of line 6 is reduced and therefore more comfortable for the user. From here, when the fish pulls line 6, the user can tire it by continuously regulating the braking torque against which the fish has to pull. Although the user can vary the braking torque between 0 Nm and completely blocking spool 5 by using regulating means 18, another alternative, if the user so wishes, is to activate lever 13 promptly. By activating lever 13, the user can completely block the feed-out of line 6, with all the advantages this implies. Moreover, for two reasons, it is possible to just promptly brake the fish's pulling action, or bring the fish closer to the shore in a particularly efficient way. First of all, thanks to planetary train 21, the retrieval speed is much greater than that of the state of the art reels, and secondly, as there is no sliding between the parts that activate spool 5, each time lever 13 is activated it is used to the maximum.

In this embodiment it is also worth highlighting gearing 4. Planetary train 21 allows line 6 to be retrieved more quickly than the state of the art reels. Also, retrieving more line 6 each time lever 13 is activated implies substantially reducing the frequency with which the rod lurches, thereby increasing the possibilities of taking the fish out of the water successfully.

According to the invention the lurching is reduced thanks to the fact that the brake does not interrupt the flow of force from lever 13 to spool 5. Since brake 8 does not slip, the user does not need to activate lever 13 as often, which reduces the lurching to an essential minimum.

Finally, it is worth highlighting that inner diameter 51, 151, 251 of spool 5, 105, 205 on which line 6, 106, 206 is taken up is greater than 70 mm, which reduces the shape memory of the fly line. This is beneficial with respect to obtaining a smooth and accurate operation of the reel according to the invention.

The invention claimed is:

1. Fly fishing reel that comprises
   [a] a housing (2, 102, 202),
   [b] driving means (3, 103, 203),
   [c] a gearing (4, 104, 204), mechanically connected to said driving means (3, 103, 203),
   [d] a rotary spool (5, 105, 205) for winding up line (6, 106, 206), connected in a mechanically rigid manner to said gearing (4, 104, 204), with said gearing (4, 104, 204) and said spool (5, 105, 205) forming a rigid kinematic unit (12, 112, 212), and
   [e] a brake (8, 108, 208) with adjustable force, characterised in that
   [f] it comprises a one-way clutch (7, 107, 207) provided between said driving means (3, 103, 203) and said gearing (4, 104, 204),
   [g] in that said brake (8, 108, 208) comprises a free wheel mechanism (9, 109, 209) with said brake (8, 108, 208) acts upon said rigid kinematic unit (12, 112, 212), and
   [h] in that said force of said brake (8, 108, 208) is regulated continuously,
so that in the line feed-out direction (6, 106, 206), said one-way clutch (7, 107, 207) is inactive and said free wheel mechanism (9, 109, 209) is active, whereas in the wind up direction of line (6, 106, 206), said one-way clutch (7, 107, 207) is active (4, 104, 204) and said free wheel mechanism (9, 109, 209) is inactive.

2. Fly fishing reel according to claim 1, characterised in that said brake (108) comprises
   [a] a first ring (137) with a first conical surface (139) and
   [b] a second rotary ring (138) with a second conical surface (140), with said first and second conical surfaces (139, 140) being suitable for co-operating mutually to generate a braking torque and in that
   [c] said second ring (138) and said gearing (104) co-operate mutually via said free wheel mechanism (109).

3. Fly fishing reel according to claim 2, characterised in that
   [a] said free wheel mechanism (109) comprises a one-way bearing (144), said one-way bearing comprising a third pinion (142), and a fourth pinion (143),
   [b] said second ring (138) comprises a fifth pinion (145) and
   [c] said ring gear (124) of said gearing (104) comprises a first outer gear teeth (141),
so that said fifth pinion (144) meshes with said fourth pinion (143), while said third pinion (142) meshes with said ring gear (124).

4. Fly fishing reel according to claim 1, characterised in that said brake (8, 208) comprises a brake disc (10, 210) with first and second parallel surfaces (36a, 36b; 236a, 236b) and at least one first brake block (11a, 211a) that can act on said first surface (36a, 236a) and a second brake block (11b, 211b) symmetrically opposite said first brake block (11a, 211a), with respect to said disc (10, 210), which can act on said second surface (36b, 236b) and in that said disc (10, 210) is linked to said gearing (4, 204) via said free wheel mechanism (9, 209), so that said brake (8, 208) acts by braking said gearing (4, 204).

5. Fly fishing reel according to claim 4, characterised in that said first brake block (11*a*, 211*a*) is fixed to said housing (2, 202), said second brake block (11*b*, 211*b*) is movable with respect to said housing (2, 202) in a direction perpendicular to said first and second surfaces (36*a*, 36*b;* 236*a*, 236*b*) and said disc (10, 210) is movable with respect to said gearing (4, 204) in said perpendicular direction.

6. Fly fishing reel according to claim 4, characterised in that
   [a] said disc (10) is a ring, with said ring being guided by inner diameter (27) of said ring, on to an outer blocking diameter (35) of said gearing (4),
   [b] said disc comprising at least two notches (28) in said inner diameter (27), said notches (28) comprising a slope (30),
   [c] in that in each notch (28) a rolling body (29) is provided, with said rolling bodies (29) being capable of being blocked between said slope (30) and said outer blocking diameter (35).

7. Fly fishing reel according to claim 1, characterised in that said driving means (3, 103, 203) comprise a swivel lever (13, 113, 213) with a gearing sector (14, 114, 214) at one end thereof, said gearing sector (14, 114, 214) having a toothed portion (16, 116, 216) that meshes with a first pinion (15, 115, 215) of said gearing (4, 104, 204) and a flat portion (17, 117, 217) that is part of said one-way clutch (7, 107, 207).

8. Fly fishing reel according to claim 7, characterised in that said flat portion (17, 117, 217) forms a saddle (26, 126, 226) that connects the main body (25, 125, 225) of said lever (13, 113, 213) to the beginning of said gearing sector (14, 114, 214).

9. Fly fishing reel according to claim 4, characterised in that said brake (8, 208) comprises means (18, 218) for regulating the braking torque, said regulating means (18, 218) comprising a take-up spring (19, 219) and a take-up screw (20, 220).

10. Fly fishing reel according to claim 1, characterised in that said gearing (4, 104, 204) comprises at least one planetary train (21, 121, 221), with said planetary train (21, 121, 221) comprising a second pinion (22, 122, 222), at least three planet gears (23, 123, 223) and a ring gear (24, 124, 224).

11. Fly fishing reel according to claim 10, characterised in that said planetary train (21, 121, 221) comprises four of said planet gears (23, 123, 223).

12. Fly fishing reel according to claim 10, characterised in that said ring gear (24, 224) comprises said outer blocking diameter (35, 235).

13. Fly fishing reel according to claim 1, characterised
   [a] in that said gearing (4, 104, 204) comprises at least one planetary train (21, 121, 221), with said planetary train (21, 121, 221) comprising a second pinion (22, 122, 222), at least three planet gears (23, 123, 223) and a ring gear (24, 124, 224), and
in that said brake (108) comprises
   [b] a first ring (137) with a first conical surface (139) and
   [c] a second rotary ring (138) with a second conical surface (140), with said first and second conical surfaces (139, 140) being suitable for co-operating mutually to generate a braking torque and
   [d] said second ring (138) and said gearing (104) co-operate mutually via said free wheel mechanism (109).

14. Fly fishing reel according to claim 1, characterised in that said spool (5, 105, 205) comprises an inner diameter (51, 151, 251) for line winding (6, 106, 206) and in that said inner diameter (51, 151, 251) is greater than 70 mm.

\* \* \* \* \*